(No Model.)

J. E. BROMLEY & A. STRAUS.
TIRE FOR VEHICLE WHEELS.

No. 441,820. Patented Dec. 2, 1890.

Witnesses
W. C. Corlies
A. M. Best.

Inventor
Joseph E. Bromley
Alexander Straus
By Cohn......
Atty's

UNITED STATES PATENT OFFICE.

JOSEPH E. BROMLEY, OF CHICAGO, ILLINOIS, AND ALEXANDER STRAUS, OF NEW YORK, N. Y.; SAID BROMLEY ASSIGNOR OF ONE-HALF TO ALFRED FEATHERSTONE, OF CHICAGO, ILLINOIS.

TIRE FOR VEHICLE-WHEELS.

SPECIFICATION forming part of Letters Patent No. 441,820, dated December 2, 1890.

Application filed October 6, 1890. Serial No. 367,144. (No model.)

*To all whom it may concern:*

Be it known that we, JOSEPH E. BROMLEY and ALEXANDER STRAUS, citizens of the United States, residing, the former at Chicago, in the county of Cook and State of Illinois, and the latter at New York, in the county of New York and State of New York, have invented certain new and useful Improvements in Tires for Vehicle-Wheels, which are fully set forth in the following specification, reference being had to the accompanying drawings, in which—

Figure 1:
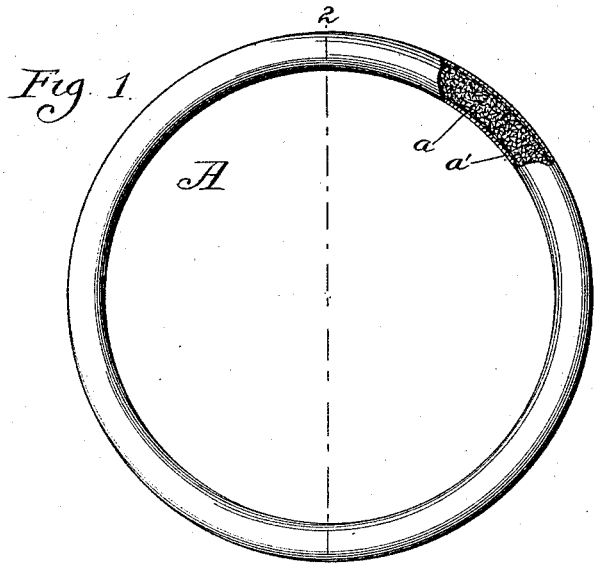
Figure 2:
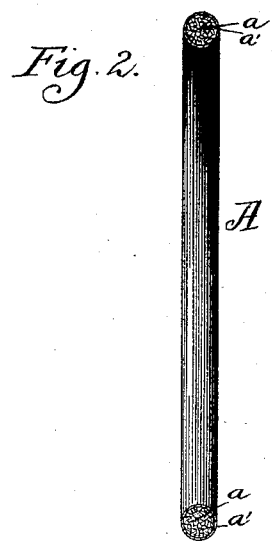
Figure 3:
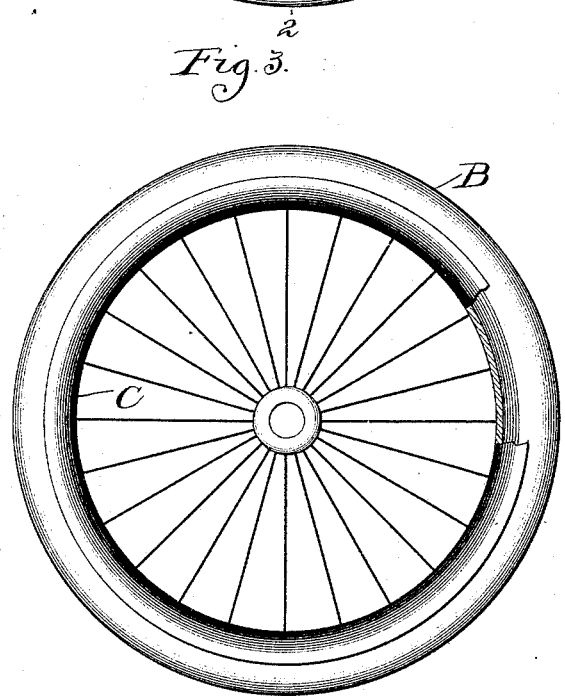
Figure 4:
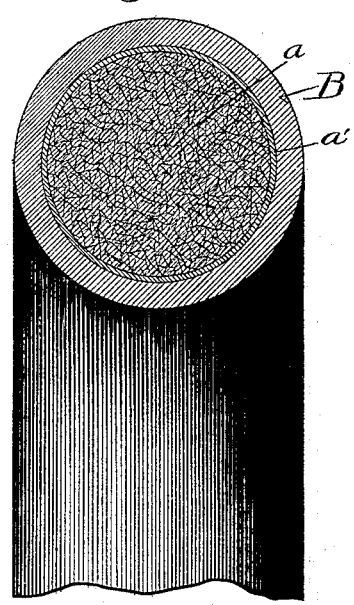

Figure 1 represents a side elevation of the core of a tire embodying our invention, the inclosing covering being slightly broken away; Fig. 2, a section of the same, taken on the line 2 2 of Fig. 1; Fig. 3, a side elevation of a wheel with our improved tire applied thereto, the felly and a portion of the tire being slightly broken away at one point; and Fig. 4, a cross-section of our improved tire on a much enlarged scale.

Our invention relates to elastic tires for the wheels of vehicles, but more especially designed for the wheels of velocipedes and bicycles.

The object of our invention is to provide an elastic tire with a firm substantially solid core and an exterior wrapping of rubber.

The invention consists in a tire having a core of cork inclosed by a suitable retaining fabric and surrounded by an outer covering of rubber.

We will describe in detail the construction and mode of producing our improved tire, and will then point out definitely in the claim the improvement which we believe to be new and desire to secure by Letters Patent.

In constructing tires after our invention a core is first made separate and entire. In the drawings, A represents this core, which is in the shape of a ring of about the size desired for the tire. The core shown in the drawings is cylindrical in cross-section; but this is not absolutely essential, as other well-known forms of wheel-tires may be employed. This core is composed of a body or filling $a$ of cork, which is surrounded and retained in place by a covering $a'$ of any suitable material. Any strong fabric is suitable for the purpose—such, for instance, as canvas. The cork filling may be composed of large sections cut from cork-wood of suitable size and shape; or the cork may be cut up finely, or in any other way disintegrated, so that the filling will be composed of fine bits of cork. What is known as "granulated cork" is well adapted for the purpose. We prefer a filling of comminuted cork, but do not confine our invention to this particular condition. The cork for the filling may be steamed or not, as preferred. We prefer to steam it, as it is then soft and pliable, as well as elastic. In order to retain this cork filling in place, so as to make a permanent core of proper form, it is inclosed within some strong fabric $a'$. Canvas is a very suitable material. This outer covering is first formed in the shape of a long canvas tube or tubular bag of the required length. This tube or bag is then filled with the cork previously prepared, the cork being pressed into the tube, so as to completely and solidly fill it. There is thus formed a long cylinder of cork and canvas or other inclosing material. The ends of this cylinder are brought together and fastened in any suitable way, thus forming a ring, as seen in Fig. 1 of the drawings. This is the core for the tire, and the latter is completed by placing this core in suitable molds and vulcanizing or molding rubber around it, thus forming an exterior covering B of rubber. The tire is then completed and is applied to a wheel C in any ordinary way. Now, it will be seen that in this construction we obtain a tire the interior or core of which is composed of an elastic material, but at the same time is tolerably firm and solid. All the advantages of an elastic core are therefore obtained, and at the same time additional advantages are secured by the peculiar nature of the material employed. It is substantially firm and solid, so that it will not move under compression like a fluid core. It is also harmless in its effect upon the rubber covering. Metallic springs, as employed as cores, cut the rubber and soon destroy it. The core is exceedingly durable. It will not break down under long and severe usage, and at the same time it is so elastic as to provide a tire having all the desirable features of elastic tires. The rubber covering is also more lasting because of the firm support it receives from the core. The fabric completely surrounding and inclosing the core-filling protects the latter and also the rubber on the outside and keeps the cork interior in permanent form. There can be no material displacement of the core.

As already stated, we do not limit ourselves to any particular condition or preparation of the cork filling, or to any particular material for directly inclosing and retaining the cork filling, or to any special form of tire in cross-section. Variations may be made in all these features.

Having thus described our invention, what we claim as new, and desire to secure by Letters Patent, is—

An elastic tire for vehicle-wheels, composed of an interior body or core of cork inclosed and retained within a covering of canvas or other suitable material, and an exterior of rubber molded or vulcanized about said core, substantially as and for the purposes specified.

JOSEPH E. BROMLEY.
ALEXANDER STRAUS.

Witnesses:
ROBERT J. CUMMINGS,
R. P. CORNWELL.